US008196096B2

(12) United States Patent
Falzone Schaw et al.

(10) Patent No.: US 8,196,096 B2
(45) Date of Patent: Jun. 5, 2012

(54) .NET RIBBON MODEL FOR A RIBBON USER INTERFACE

(75) Inventors: Rachel M. Falzone Schaw, Seattle, WA (US); Hao Liu, Sammamish, WA (US); Stephen James Styrchak, Kirkland, WA (US); Lubomir I. Birov, Redmond, WA (US); Daniel A. Molina, Redmond, WA (US); Vladimir Morozov, Sammamish, WA (US); Christian Crowser, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 23 days.

(21) Appl. No.: 12/984,513

(22) Filed: Jan. 4, 2011

(65) Prior Publication Data

US 2011/0154286 A1 Jun. 23, 2011

Related U.S. Application Data

(62) Division of application No. 11/692,825, filed on Mar. 28, 2007, now Pat. No. 7,865,868.

(51) Int. Cl.
*G06F 9/44* (2006.01)

(52) U.S. Cl. ........................................ 717/109; 717/107

(58) Field of Classification Search ........... 717/106–109
See application file for complete search history.

(56) References Cited

U.S. PATENT DOCUMENTS

| 5,872,973 | A | 2/1999 | Mitchell et al. |
| 6,038,395 | A | 3/2000 | Chow et al. |
| 6,237,135 | B1 * | 5/2001 | Timbol .................. 717/107 |
| 6,385,769 | B1 | 5/2002 | Lewallen |
| 6,434,598 | B1 | 8/2002 | Gish |
| 6,484,180 | B1 | 11/2002 | Lyons et al. |
| 6,701,513 | B1 | 3/2004 | Bailey |
| 6,990,652 | B1 | 1/2006 | Parthasarathy et al. |
| 7,069,538 | B1 | 6/2006 | Renshaw |
| 7,340,721 | B1 * | 3/2008 | Bailey .................. 717/109 |
| 2004/0030993 | A1 | 2/2004 | Hong Huey et al. |
| 2005/0055449 | A1 | 3/2005 | Rappold |
| 2005/0251757 | A1 | 11/2005 | Farn |
| 2006/0117302 | A1 | 6/2006 | Mercer et al. |
| 2006/0282817 | A1 | 12/2006 | Darst et al. |
| 2006/0294526 | A1 | 12/2006 | Hambrick et al. |
| 2008/0109785 | A1 * | 5/2008 | Bailey .................. 717/109 |
| 2008/0134138 | A1 | 6/2008 | Chamieh et al. |
| 2008/0155555 | A1 | 6/2008 | Kwong |

OTHER PUBLICATIONS

Adler, Richard, M., "Emerging Standards for Component Software," Cybersquare, 1995 IEEE (10 pages).
Chamberland, L.A., et al., "IBM VisualAge for Java," vol. 37, No. 3, 1998 (26 pages) http://researchweb.watson.ibm.com/journal/sj/373/chamberland.html [Accessed Feb. 6, 2007].

(Continued)

*Primary Examiner* — Anna Deng
(74) *Attorney, Agent, or Firm* — Perkins Coie LLP

(57) ABSTRACT

An object model is provided that allows .NET developers to customize the Office Ribbon user interface according to a .NET Ribbon model rather than the Ribbon XML/callback model of Office applications. The .NET Ribbon model implements the IRibbonExtensibility interface and provides properties and events for Ribbon components. At runtime, the .NET Ribbon model generates and provides an Office application or document with the XML needed to render the custom Ribbon user interface. A visual designer tool uses the .NET Ribbon model to provide .NET developers with a component view architecture that allows developers to set component properties and generate events.

15 Claims, 10 Drawing Sheets

OTHER PUBLICATIONS

Zykov, Sergey V., "ConceptModeller: A Problem-Oriented Visual SDK for Globally Distributed Enterprise Systems," Proceedings of the 7th International Workshop on Computer Science and Information Technologies, CSIT 2005 (4 pages).

* cited by examiner

.NET RIBBON MODEL FOR A RIBBON USER INTERFACE

This application is a divisional application of U.S. patent application Ser. No. 11/692,825, filed on Mar. 28, 2007, and entitled ".NET RIBBON MODEL FOR A RIBBON USER INTERFACE," which is incorporated herein in its entirety by reference.

BACKGROUND

Developers of many application programs ("applications") implement the applications so that they can be customized by third parties. To customize an application, a third party develops custom code (e.g., add-ins and document-level customizations) that uses functionality exposed by the application. The custom code may improve the usability of the applications or provide additional functionality (e.g., domain-specific functionality). Such applications are referred to as "host applications" because the custom code is hosted within the process of the application. Developers of applications typically want to encourage the development of custom code for their applications to increase the demand for their applications. As a result, such developers may provide "runtimes" that facilitate the development of custom code. A runtime is code that is loaded along with custom code and provides services to the custom code. These services may include higher-level functionality than exposed by the application or may include domain-specific functionality. When an application is to load and start the execution of custom code, the application may load the runtime and direct the runtime to load and start the execution of the custom code.

Because of the ease of developing custom code as "managed code," many applications support the execution of custom code in the .NET Framework provided by Microsoft Corporation. The .NET Framework provides a common language runtime ("CLR") that provides high-level operating system type services to the managed programs (including custom code and applications) and serves as an execution engine for managed programs. The CLR ensures that managed programs do not take any unauthorized action. As such, the CLR acts as a "sandbox" within which managed programs execute. The CLR provides application domains ("appdomains") in which different managed programs can execute to help ensure that an errant managed program will not unduly affect the execution of another managed program.

The Microsoft Office suite of applications introduces a new user interface called the Ribbon. The Ribbon replaces menus and toolbars in several Office applications. The Ribbon provides an XML/callback model that allows developers to create a custom Ribbon user interface for Office documents and applications by extending the standard Ribbon user interface. The XML/callback model requires a developer to generate an XML document that describes the custom user interface. Table 1 illustrates a sample XML document describing a custom user interface.

TABLE 1

```
1.  <customUI
      xmlns="http://schemas.microsoft.com/office/2006/01/customui">
2.    <ribbon>
3.      <tabs>
4.        <tab id="Tab1" label="Tab1">
5.          <group id="Group1" label="Group1">
6.            <button id="Button1"
                 onAction="Button1_OnAction"
                 label="Button1" />
```

TABLE 1-continued

```
7.          </group>
8.        </tab>
9.      </tabs>
10.   </ribbon>
11. </customUI>
```

Lines 1 and 11 are "customUI" tags that delimit the description of the user interface. Lines 2 and 10 are "ribbon" tags that delimit the description of the Ribbon elements to extend the Ribbon. Lines 3 and 9 are "tabs" tags that delimit the description of multiple tabs of the extended user interface. Lines 4 and 8 are "tab" tags that delimit the description of a tab. The described tab has an "id" of "Tab1" and a label of "Tab1" as attributes. Lines 5 and 7 are "group" tags that delimit the description of a group within the tab. The described group has an "id" of "Group1" and a label of "Group 1" as attributes. Line 6 is a "button" tag that defines a button within a group. The button has an "id" of "Button1," an "on Action" of "Button1_OnAction," and a label of "Button1" as attributes. The extended user interface thus has one tab with a group that contains one button. When a user takes some action directed to (e.g., clicks on) "Button1," the Office application calls back to the add-in using the IDispatch interface of Microsoft's Component Object Model ("COM") passing an indication of "Button1_OnAction." The add-in can then handle the user action as appropriate.

Table 2 illustrates code generated by a developer using the XML/callback model to extend a Ribbon user interface.

TABLE 2

```
1.  {
2.    [ComVisible(true)]
3.    public class Ribbon : Office.IRibbonExtensibility
4.    {
5.      private Office.IRibbonUI ribbon;
6.
7.      public Ribbon( )
8.      {
9.      }
10.
11.     public string GetCustomUI(string ribbonID)
12.     {
13.       return GetResourceText("ExcelAddIn3.Ribbon");
14.     }
15.
16.     public void OnLoad(Office.IRibbonUI ribbonUI)
17.     {
18.       this.ribbon = ribbonUI;
19.     }
20.
21. //Button On_Action Callback
22.     public void Button1_OnAction(Office.IRibbonControl control)
23.     {
24.       MessageBox.Show("Hello World");
25.     }
26.
27.     private static string GetResourceText(string resourceName)
28.     {
29.       Assembly asm = Assembly.GetExecutingAssembly( );
30.       string[ ] resourceNames = asm.GetManifestResourceNames( );
31.       for (int i = 0; i < resourceNames.Length; ++i)
32.       {
33.         if (string.Compare(resourceName, resourceNames[i],
              StringComparison.OrdinalIgnoreCase) == 0)
34.         {
35.           using (StreamReader resourceReader = new
                StreamReader(asm.GetManifestResourceStream(resourceNames[i])))
36.           {
37.             if (resourceReader != null)
38.             {
39.               return resourceReader.ReadToEnd( );
```

TABLE 2-continued

```
40.              }
41.            }
42.          }
43.        }
44.        return null;
45.      }
46.
47.    }
48. }
```

Line 3 indicates that the class Ribbon implements the IRibbonExtensibility interface. The IRibbonExtensibility interface includes a GetCustomUI function. When an Office application initially loads an add-in, it requests the IRibbonExtensibility interface from the add-in. The Office application then calls the GetCustomUI function to retrieve the XML string describing the extended user interface. The Office application also calls an OnLoad function, which is defined by the top level XML element—customUI, to provide an IRibbonUI interface to the add-in. Lines 11-14 illustrate that the GetCustomUI function implemented by a developer invokes a GetResourceText function to retrieve the XML file to return to the Office application. Lines 16-19 illustrate that the OnLoad function implemented by a developer stores a reference to the IRibbonUI interface passed by the Office application. The IRibbonUI interface includes an InvalidateControl function for notifying the Office application that a component of the extended user interface has been modified (e.g., a new label has been defined for a button). Lines 21-25 illustrate the "Button1_OnAction" callback method. When a user performs some action directed to "Button1," as described in Table 1, the Office application invokes the Invoke function of the IDispatch interface passing as a parameter "Button1_OnAction." The Invoke function then invokes the method of lines 21-25. The Office application retrieves a reference to the IDispatch interface by invoking the QueryInterface function of the (Unknown interface of the COM model. Lines 27-44 illustrate an implementation of the GetResourceText function. The GetResourceText function is one way that the GetCustomUI function may return the XML string. The GetCustomUI function may alternatively return the XML string in another manner.

This XML/callback model for Ribbon customization, which requires creating an XML document and constructing callback methods, may not be familiar or intuitive to all developers. In particular, the XML/callback model for Ribbon customization is not intuitive to developers familiar with standard .NET programming. The .NET programming experience is generally characterized by utilization of a class library, operating on objects through properties and events, and other features.

SUMMARY

An object model is provided that allows .NET developers to customize the Office Ribbon user interface according to a .NET Ribbon model rather than the Ribbon XML/callback model of Office applications. The .NET Ribbon model implements the IRibbonExtensibility interface and provides properties and events for Ribbon components. At runtime, the .NET Ribbon model generates and provides an Office application or document with the XML needed to render the custom Ribbon user interface. A visual designer tool uses the .NET Ribbon model to provide .NET developers with a component view architecture that allows developers to set component properties and generate event handlers. The visual designer tool enables developers to add controls representing Ribbon components to a design surface to define a Ribbon layout. Some of the controls available for use by the developer may be complex controls, which represent Ribbon components that may contain other Ribbon components as items. The visual designer provides the developer with a complex control architecture, displaying a nested design surface for the complex control into which the developer may add controls just as in the primary design surface.

This Summary is provided to introduce a selection of concepts in a simplified form that are further described in the Detailed Description. This Summary is not intended to identify key features or essential features of the claimed subject matter, nor is it intended to be used as an aid in determining the scope of the claimed subject matter.

DETAILED DESCRIPTION

An object model is provided that allows .NET developers to customize the Office Ribbon user interface according to a .NET Ribbon model rather than the Ribbon XML/callback model of Office applications. The .NET Ribbon model implements the IRibbonExtensibility interface and provides properties and events for Ribbon components. At runtime, the .NET Ribbon model generates and provides an Office application or document with the XML needed to render the custom Ribbon user interface. A visual designer tool uses the .NET Ribbon model to provide .NET developers with a component view architecture that allows developers to set component properties and generate events. The visual designer tool enables developers to add controls representing Ribbon components to a design surface to define a Ribbon layout.

Some of the controls available for use by the developer may be complex controls, which represent Ribbon components that may contain other Ribbon components as items. The visual designer tool provides the developer with a complex control architecture, displaying a nested design surface for the complex control into which the developer may add controls just as in the primary design surface.

.NET Ribbon Model

A system for providing an alternate model (e.g., .NET Ribbon model) for a primary model (e.g., XML/callback model) for extending a user interface of a host application by custom code is provided. The primary model uses a non-programmatic (e.g., XML-based) description of the relationship between components of the user interface and uses a callback mechanism to provide notifications to the custom code. The system provides, for each component type of the user interface, a class definition including an implementation of a get description method for dynamically generating a non-programmatic description of the component from a programmatic description of the component and its relationship to other components. The system also provides a specification of the relationship between the components. The system provides an implementation of a get user interface function to be invoked by the host application to get the non-programmatic description of the user interface. The get user interface function invokes the get description method of the user interface component for dynamically generating the non-programmatic description from the programmatic description. The system also provides an implementation of an invoke function to be invoked by the host application to provide notifications to the custom code. The invoke function converts an invocation to an event notification for a component of the user interface.

Figure 1:
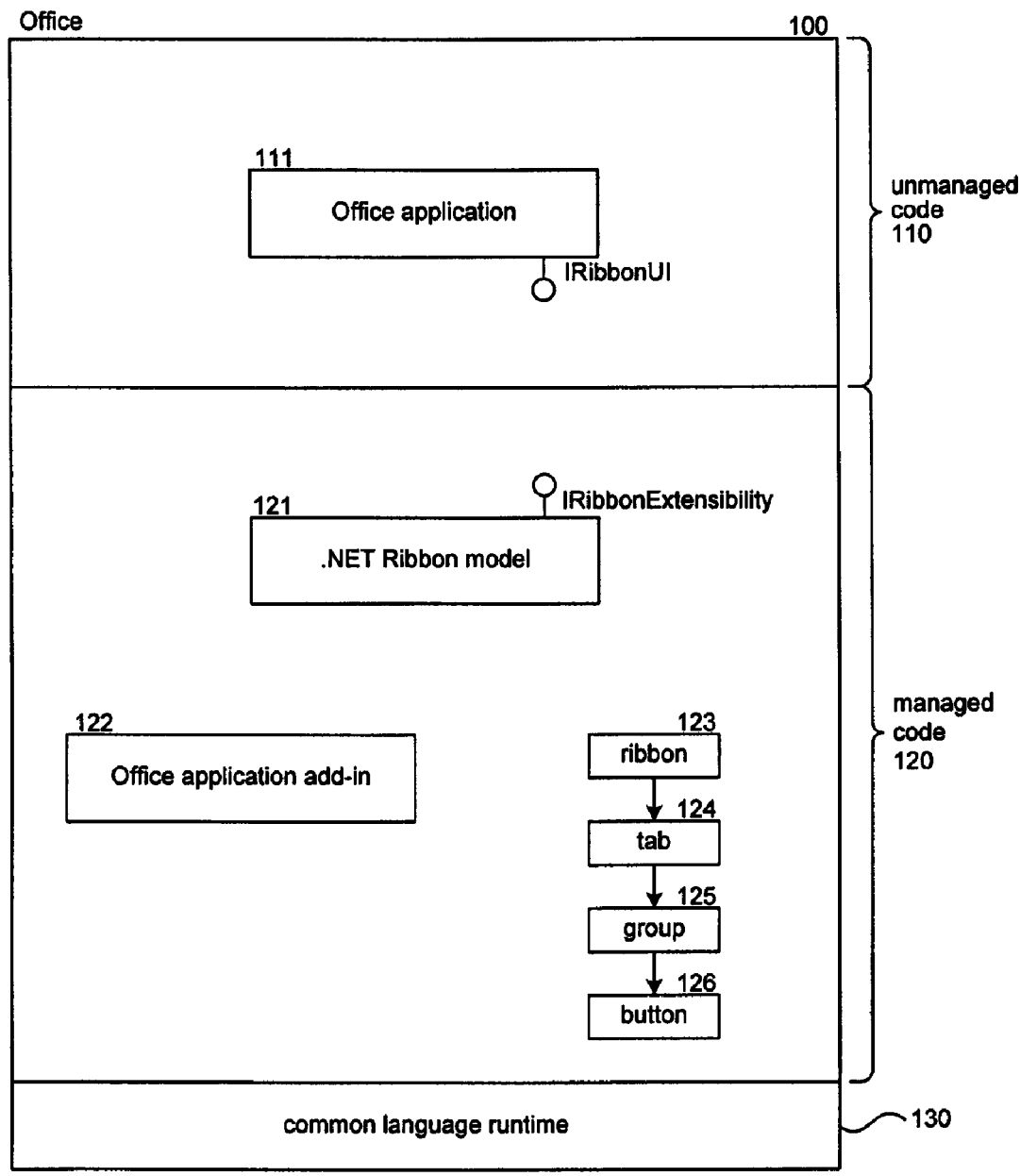
FIG. 1 is a block diagram that illustrates an Office program that employs the Ribbon user interface in one embodiment.
Figure 2:
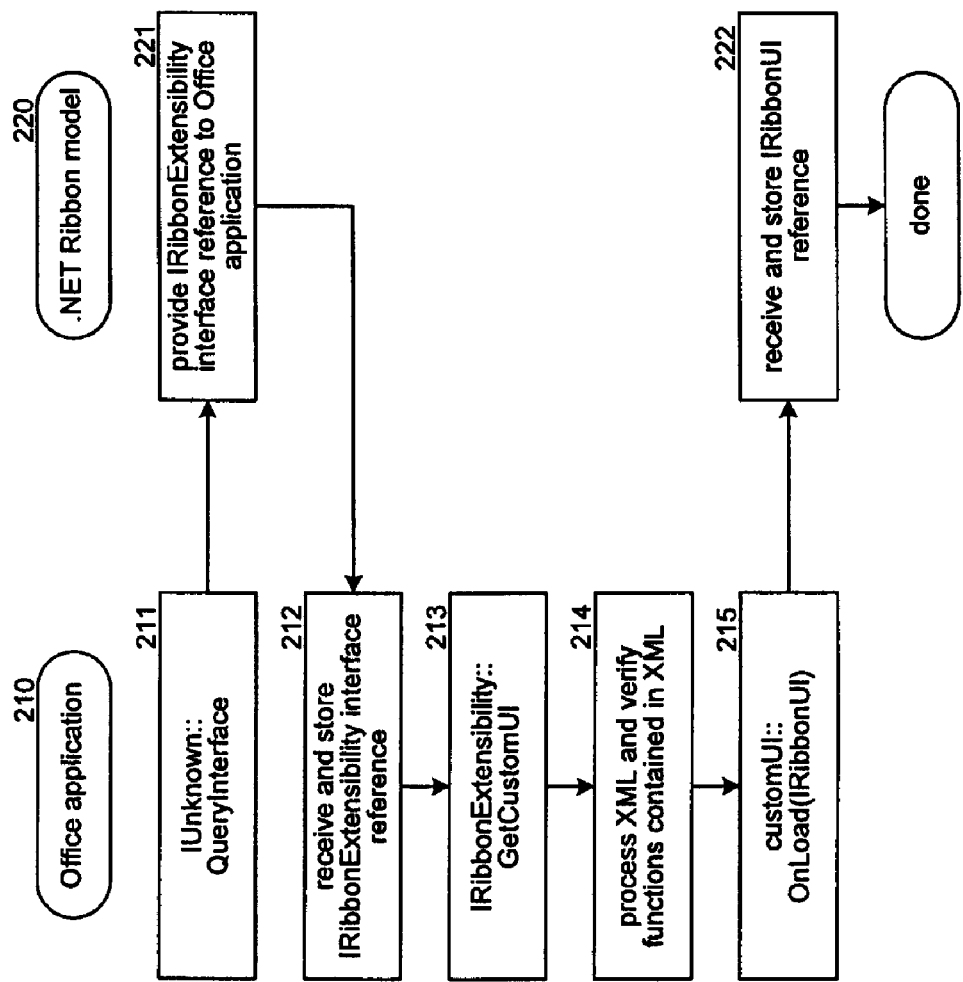
FIG. 2 is a flow diagram that illustrates the process of Ribbon interfaces being exchanged between the .NET Ribbon model and an Office application in one embodiment.

An object model is provided that allows .NET developers to customize the Office Ribbon user interface according to a .NET Ribbon model rather than the Ribbon XML/callback model of Office applications. The .NET Ribbon model implements the IRibbonExtensibility interface and provides properties and events for Ribbon components. FIG. 1 is a block diagram that illustrates an Office program 100 that employs the Ribbon user interface in one embodiment. The Office program comprises unmanaged code 110, managed code 120, and a common language runtime ("CLR") 130. The unmanaged code 110 comprises an Office application 111 (a host application) that exposes the IRibbonUI interface to a .NET Ribbon model 121. The managed code 120 comprises the .NET Ribbon model 121 and an Office application add-in 122 (custom code). The .NET Ribbon model 121 sits between the unmanaged Office application 111 and the managed Office application add-in 122. The .NET Ribbon model 121 exposes the IRibbonExtensibility interface to the Office application 111. FIG. 2 is a flow diagram that illustrates the process of Ribbon interfaces being exchanged between the .NET Ribbon model 220 and an Office application 210 (or document for a document-level customization) in one embodiment. The Office application 210 instantiates and loads an Office application add-in. The Office application 210 invokes 211 the QueryInterface function of the IUnknown interface of the COM model. In response, the .NET Ribbon model 220 provides 221 the Office application 210 with the IRibbonExtensibility interface reference. The Office application 210 receives and stores 212 a reference to the IRibbonExtensiblity interface. The Office application 210 calls 213 the GetCustomUI function of the IRibbonExtensibility interface to get an XML representation of the custom Ribbon user interface. The Office application 210 processes 214 the XML and verifies that all callback functions contained in the XML are in place by calling the GetIDsOfNames function of the IDispatch interface. If an OnLoad function is specified by the top level XML element—customUI, the Office application 210 calls 215 the OnLoad function. The OnLoad function provides the IRibbonUI interface to the .NET Ribbon model 220. The .NET Ribbon model 220 receives and stores 222 a reference to the IRibbonUI interface.

The Office application add-in creates a Ribbon object comprised of Ribbon components. The .NET Ribbon model provides implementations of classes for various components that can be used to extend the Ribbon user interface. For example, the components may include a ribbon, a tab, a group, a button, and other components. The add-in instantiates a Ribbon object of a class implemented by the developer of the add-in. The Ribbon class may inherit a base class provided by the .NET Ribbon model that provides functionality to implement the .NET Ribbon model. The add-in then initializes each of the components that define the extended Ribbon user interface. The add-in may initialize the components by invoking an InitializeComponent method of the instantiated Ribbon object, invoking code written by a developer, deserializing components from a file, or other means. Returning to FIG. 1, to define the extended Ribbon user interface, the add-in 122 instantiates the desired components and initializes the properties of the components. For example, add-in 122 instantiates a Ribbon object 123, a tab object 124, a group object 125, and a button object 126. The add-in initializes the properties of each Ribbon component, which may include label, size, image, and other properties. The add-in may also define the relationship between the components. For example, in FIG. 1, the Ribbon object 123 contains the tab object 124, which contains the group object 125, which contains the button object 126. The add-in may also define event handlers for the Ribbon components. For example, the add-in may use the on Action method to handle an event that will occur when a user selects (e.g., clicks on) a button.

At runtime, the Office application calls the IRibbonExtensibility.GetCustomUI function to retrieve the XML that describes the extension to the Ribbon user interface. The GetCustomUI function may instantiate an object to represent the XML document. The GetCustomUI function invokes the WriteXml method of the Ribbon object to create an XML description of the extended Ribbon user interface. The WriteXml method is a functionality provided by the base class inherited by a Ribbon class provided by a developer. The WriteXml method receives an instance of the XmlWriter class as a parameter. XmlWriter is a base abstract class defined by the .NET Framework, which supports the quick and efficient creation of an XML document. The .NET Ribbon model provides an implementation of the WriteXml method for each class of component. The WriteXml method of the Ribbon class invokes the WriteXml method of each tab object within a Ribbon object to allow each tab object to add its XML description to the XML document object. Each WriteXml method of each tab object invokes the WriteXml method of its constituent objects. This process continues to the leaf objects of the extended Ribbon user interface.

If a property of a Ribbon component changes at runtime, the implementation of the class provided by the .NET Ribbon model notifies the Office application by invoking the InvalidateControl function of the IRibbonUI interface to provide notification of the component that has changed. For example, a Microsoft Excel document may contain a listing of stock quotes that are updated periodically, based on the most recent information. The add-in that provides the stock quotes may monitor an RSS feed of stock quotes and update the label of a button representing the price of a stock whenever the price changes. When the add-in sets the label of the button object, the implementation of the button object invokes the InvalidateControl function of the IRibbonUI interface passing an indication of the button object. The InvalidateControl function notifies the Office application that the values acquired for the button object through callback methods are invalid. The Office application calls the callback methods corresponding to the changed button object to get new values for the button object. The Office application invokes the Invoke function of the IDispatch interface passing an indication of the button object and an indication of a get label method of the button object. (The invocation of the Invoke function of the IDispatch interface is converted by the .NET Framework into an invocation of the InvokeMember function of the IReflect interface of the .NET Framework.) The InvokeMember function invokes the getLabel method of the button object to get the new label and returns the new label to the Office application. The Office application then updates the label of the displayed button. The Office application also calls all other callback methods defined for the button, such as getImage, getDescription, getEnabled, and other callback methods.

At runtime, the .NET Ribbon model provides event notifications relating to the extended Ribbon user interface to the add-in. Each constituent object of a component class implemented by the .NET Ribbon model registers a virtual callback method with the Office application when it is initialized. For example, a button object Button1 might register callback methods including Button1_OnGetLabel and Button1_OnAction. When the Office application detects a user interaction with one of the components of the extended Ribbon user interface, it invokes the appropriate virtual callback method via the Invoke function of the IDispatch interface. For example, if a user has clicked on Button1, the Invoke function passes an indication of the registered callback method, Button1_OnAction. The invocation of the Invoke function is converted by the .NET Framework into an invocation of the InvokeMember function of the IReflect interface. The InvokeMember method examines the callback method name and determines from the name that it should invoke the OnAction method of the object Button1. In this manner, virtual callbacks are registered to allow a Ribbon component to map the callback name invoked by Office to the actual method implementing the functionality. When the actual method is implemented on a Ribbon component, an event notification is raised for that component.

Table 3 illustrates code generated by a developer that uses .NET Ribbon model to extend the Ribbon.

TABLE 3

```
1.    public class Ribbon1 : ExcelRibbon
2.    {
3.        private RibbonTab tab1;
4.        private RibbonGroup group1;
5.        private RibbonButton button1;
6.        public Ribbon1( )
7.        {
8.            InitializeComponent( );
9.        }
10.
11.       private void InitializeComponent( )
12.       {
13.           this.tab1 = new RibbonTab( );
14.           this.group1 = new RibbonGroup( );
15.           this.button1 = new RibbonButton( );
16.           this.tab1.SuspendLayout( );
17.           this.group1.SuspendLayout( );
18.           this.SuspendLayout( );
```

TABLE 3-continued

```
19.           //
20.           // tab1
21.           //
22.           this.tab1.Label = "tab1";
23.           this.tab1.Name = "tab1";
24.           this.tab1.RibbonGroups.Add(this.group1);
25.           //
26.           // group1
27.           //
28.           this.group1.Label = "group1";
29.           this.group1.Name = "group1";
30.           this.group1.RibbonControls.Add(this.button1);
31.           //
32.           // button1
33.           //
34.           this.button1.Label = "button1";
35.           this.button1.Name = "button1";
36.           this.button1.OnAction += new
              System.EventHandler<ControlEventArgs>
              (this.button1_OnAction);
37.           //
38.           // Ribbon1
39.           //
40.           this.Name = "Ribbon1";
41.           this.RibbonTabs.Add(this.tab1);
42.           this.tab1.ResumeLayout(false);
43.           this.tab1.PerformLayout( );
44.           this.group1.ResumeLayout(false);
45.           this.group1.PerformLayout( );
46.           this.ResumeLayout(false);
47.
48.       }
49.       private void button1_OnAction(object sender,
              ControlEventArgs e)
50.       {
51.           this.button1.Label = "button1 clicked";
52.       }
53.   }
```

Lines 3-5 define the data members of the class Ribbon1 to include the tab, group, and button of Table 1. Lines 11-48 illustrate the defining of the extended Ribbon user interface within an InitializeComponent method. Lines 13-15 instantiate objects for the tab, group, and button. Lines 22-24 set the label and name attributes for the tab and add the group to the tab. Lines 28-30 set the label and name attributes for the group and add the button to the group. Lines 34-36 set the label and name attributes for the button and define that the "button1_OnAction" event handler should be invoked to handle events related to the button. Lines 40-41 set the name of the Ribbon extension and add the tab to the Ribbon. Lines 49-52 illustrate the event handler for the button.

Table 4 illustrates code for a button object under the .NET Ribbon model.

TABLE 4

```
1.    public sealed class RibbonButton
2.    {
3.        private IRibbonUI ui;
4.        private string label;
5.        public string Label
6.        {
7.            get { return this.label; }
8.            set
9.            {
10.               if (value != this.label)
11.               {
12.                   label = value;
13.                   InvalidateControl:This.ui.InvalidateControl(this.Id);
14.               }
15.           }
16.       }
17.       internal string OnGetLabel(IRibbonControl control)
```

TABLE 4-continued

```
18.    {
19.        return this.Label;
20.    }
21. }
```

Lines 8-15 illustrate the set method that sets of the value for the button. Line 13 illustrates that an Invalidate function is invoked to notify the Office application that the label of the button has changed. When the button generates its XML description it specifies "<button getLabel="buttonID_OnGetLabel"/>," where buttonID is the identifier for the button object. When the Office application is notified that the label of the button has changed, it invokes the buttonID_OnGetLabel method via the IDispatch interface to get the new label.

Figure 3:
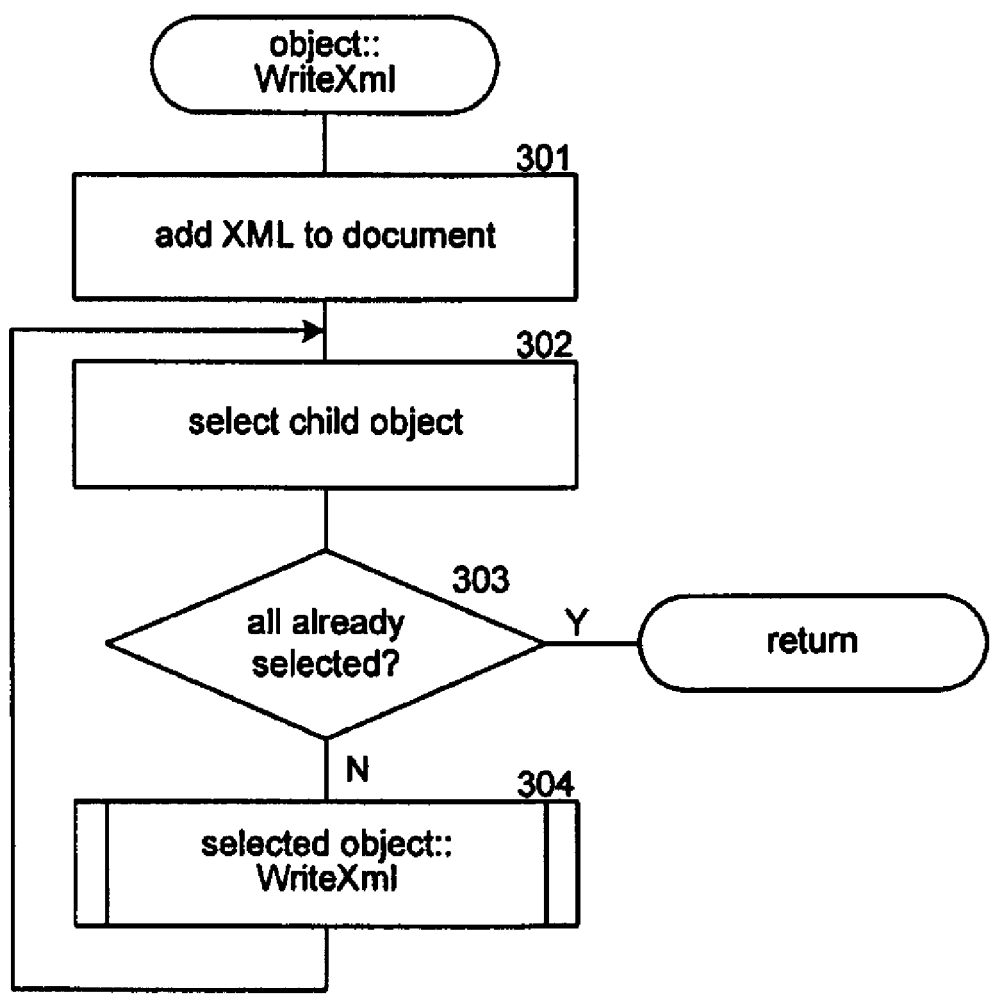
FIG. 3 is a flow diagram that illustrates the process of generating XML markup that corresponds to the custom Ribbon user interface in one embodiment.

An Office application or document expects an add-in to return an XML document that describes the custom Ribbon user interface. Each Ribbon object generates an XML description of its object and an XML description of all of its child objects. For example, a group provides the XML description of the group and the XML description of all of the objects that compose the group. A root Ribbon object may therefore generate an XML document that describes the entire custom Ribbon user interface. At runtime, the .NET Ribbon model automatically generates an XML document that represents the custom Ribbon user interface. The add-in calls the GetCustomUI function defined by the IRibbonExtensibility interface, which retrieves the XML for the custom Ribbon user interface. FIG. 3 is a flow diagram that illustrates the process of generating the XML markup that corresponds to the custom Ribbon in one embodiment. In block 301, the method adds the XML markup that describes an object to the document that describes the custom Ribbon user interface. In blocks 302-304, the method invokes the WriteXml method of each child object so that the child object can add its XML description to the document. In block 302, the method selects the next child object. In decision block 303, if all the child objects have already been selected, then the method returns, else the method continues at block 304. In block 304, the component invokes the WriteXml method of the selected child object and then loops to block 302 to select the next child object. Once the XML description for each of the objects has been added to the string, the string is complete and may be provided to the Office application or document.

Table 5 illustrates how the .NET Ribbon model automatically generates the XML description of the extended Ribbon user interface.

TABLE 5

```
1. public sealed partial class RibbonExtensibility : Microsoft.Office.Core.IRibbonExtensibility
2. {
3.     private const string customUI = "<customUI
           xmlns=\"http://schemas.microsoft.com/office/2006/01/customui\"></customUI>";
4.     private Ribbon ribbon;
5.     public string GetCustomUI(string ribbonID)
6.     {
7.         if (this.ribbon == null)
8.             return String.Empty;
9.         XmlDocument document = new XmlDocument( );
10.        document.LoadXml(customUI);
11.        XmlElement ribbonElement = ribbon.WriteXml(document);
12.        document.DocumentElement.AppendChild(ribbonElement);
13.        return document.InnerXml;
14.    }
15. }
16.
17. public partial class Ribbon
18. {
19.    private const string xmlNamespace = @"http://schemas.microsoft.com/office/2006/01/custo-
           mui";
20.    internal protected XmlElement WriteXml(XmlDocument document)
21.    {
22.        // create the "ribbon" element
23.        XmlElement ribbonElement = document.CreateElement("ribbon", xmlNamespace);
24.
25.        if (this.RibbonTabs.Count > 0)
26.        {
27.            XmlElement tabs = document.CreateElement("tabs", xmlNamespace);
28.            // add the tab elements to "tabs" element
29.            foreach (Tab tab in this.RibbonTabs)
30.            {
31.                tabs.AppendChild(tab.WriteXml(document));
32.            }
33.            // add "tabs" to "ribbon"
34.            element.AppendChild(tabs);
35.        }
36.        return element;
37.    }
38. }
39.
```

Lines 5-14 illustrate the processing of the GetCustomUI function of the IRibbonExtensibility interface. The function dynamically generates the XML description of the Ribbon object. Line 10 illustrates an instantiation of an object to represent the XML document. Line 11 illustrates the invocation of the WriteXml method that adds an XML description of the extended Ribbon. Line 13 illustrates the returning of the XML description to the Office application. Lines 20-36 illustrate the processing of the WriteXml method. Line 23 adds the "ribbon" tag to the XML description. Line 27 adds the "tabs"

tag to the XML description. Lines 29-33 illustrate the invocation of the WriteXml method of each tab component. Line 34 adds the closing "tabs" tag to the XML description.

An extended Ribbon user interface may include multiple objects of the same type. For example, a custom Ribbon may contain several buttons. Accordingly, in the .NET Ribbon model each callback method may be implemented by a collection of Ribbon objects. The Ribbon implementation differentiates the callback names in order to dispatch the call from Office to the proper object. The .NET Ribbon model customizes the IDispatch interface to call back to the appropriate methods of the components. An object identification method is used to differentiate Ribbon objects and their corresponding callback methods. When the object is created, the .NET Ribbon model generates a unique identifier for each object representing a component of the extended Ribbon. The .NET Ribbon model adds the unique identifier to the callback name provided by each object in the XML description of the object. For example, the callback method names of a Ribbon object Button1 may include Button 1_OnGetLabel and Button1_OnAction. Thus, when the Office application calls back via the IDispatch interface, it passes the callback name with the object identifier. The object identifiers are stored in a dictionary that matches each object identifier to its callback methods. The .NET Ribbon model consults the dictionary to determine to which object the callback should be directed.

Figure 4:
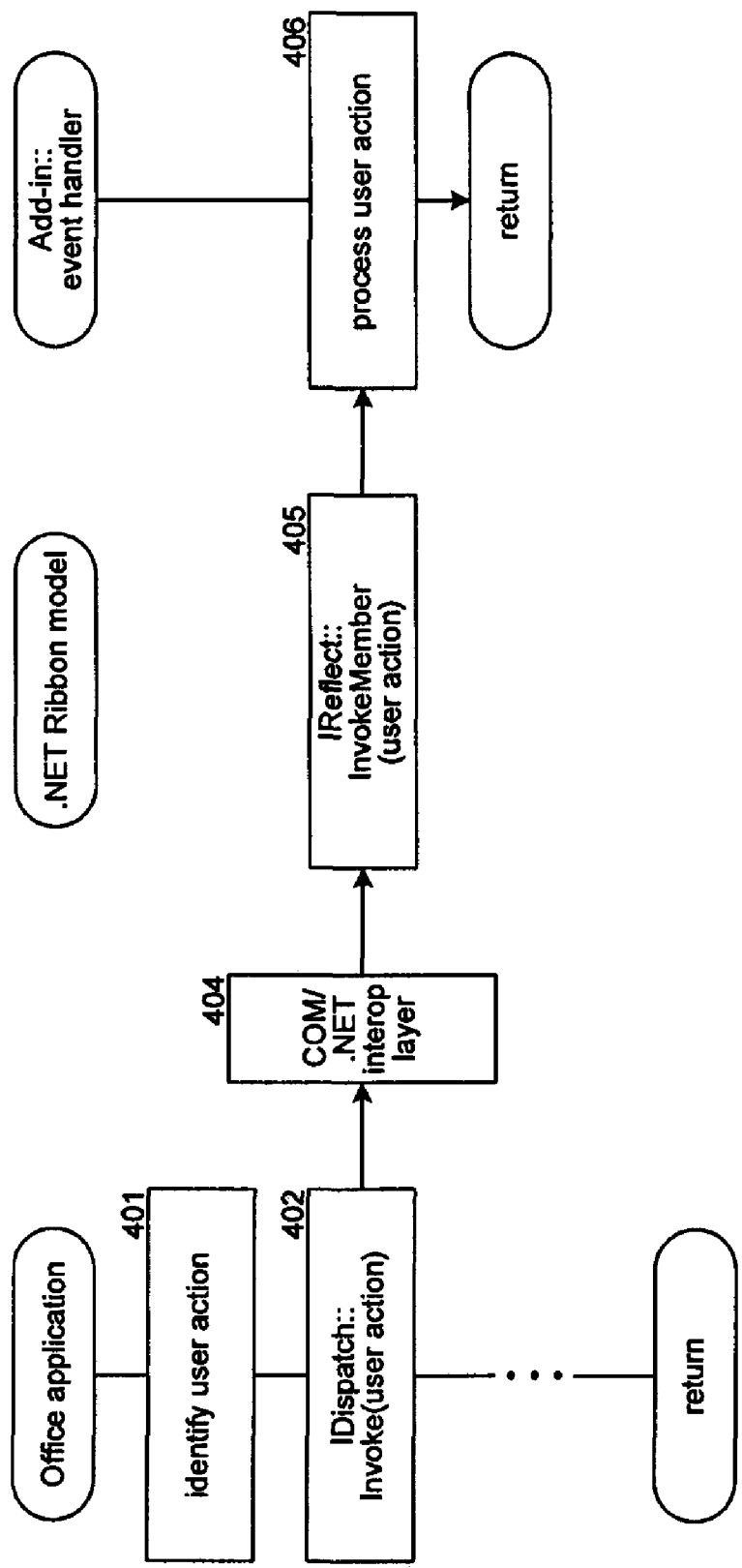
FIG. 4 is a flow diagram that illustrates the processing of a user action on a Ribbon component in one embodiment.

Users may interact with a custom Ribbon user interface via an Office application or document. FIG. 4 is a flow diagram that illustrates the processing of a user action on a Ribbon component in one embodiment. In block 401, the Office application identifies that a user action, such as a click on a Ribbon component, has occurred. In block 402, Office calls IDispatch.Invoke on the user action. The IDispatch.Invoke function is translated by the COM/.NET interop layer in block 404 into an IReflect function, InvokeMember, for the .NET Ribbon model. In block 405, the .NET Ribbon model calls IReflect.InvokeMember on the user action. In block 406, the add-in processes the user action according to the event handler.

Designer—Component View Architecture

A visual designer tool provides .NET developers a component view architecture that allows developers to develop an extended Ribbon user interface based on the .NET Ribbon model. The visual designer tool enables developers to add visual representations of Ribbon components to a design surface to define a Ribbon layout. The developer can set the properties of the components and define event handlers for the components. When the developer completes the design, the visual designer tool generates the implementation of the code based on the design. For example, the visual designer tool may generate code like that of Table 3.

The visual designer tool leverages existing Microsoft .NET, WinForms (the System.Windows.Forms class library and namespace that is part of the .NET Framework), and Visual Studio technologies and infrastructures to provide the developer with an interface for customizing the Office Ribbon user interface. However, these existing technologies and infrastructures are designed to provide a programming interface for control-derived components, and Ribbon objects are not controls. To overcome this design difference, the visual designer tool uses a component view architecture. At design time, a control-derived view object is defined for each Ribbon object. A view object is a custom WinForms control that appears to the developer to be a Ribbon object. Each view object uses a custom TypeDescriptionProvider class to expose only the properties and events of the Ribbon component it represents, hiding any properties or events not associated with the Ribbon component it represents. When the design is complete, the visual designer tool generates the code to implement the extended Ribbon user interface from the view objects.

Figure 5:
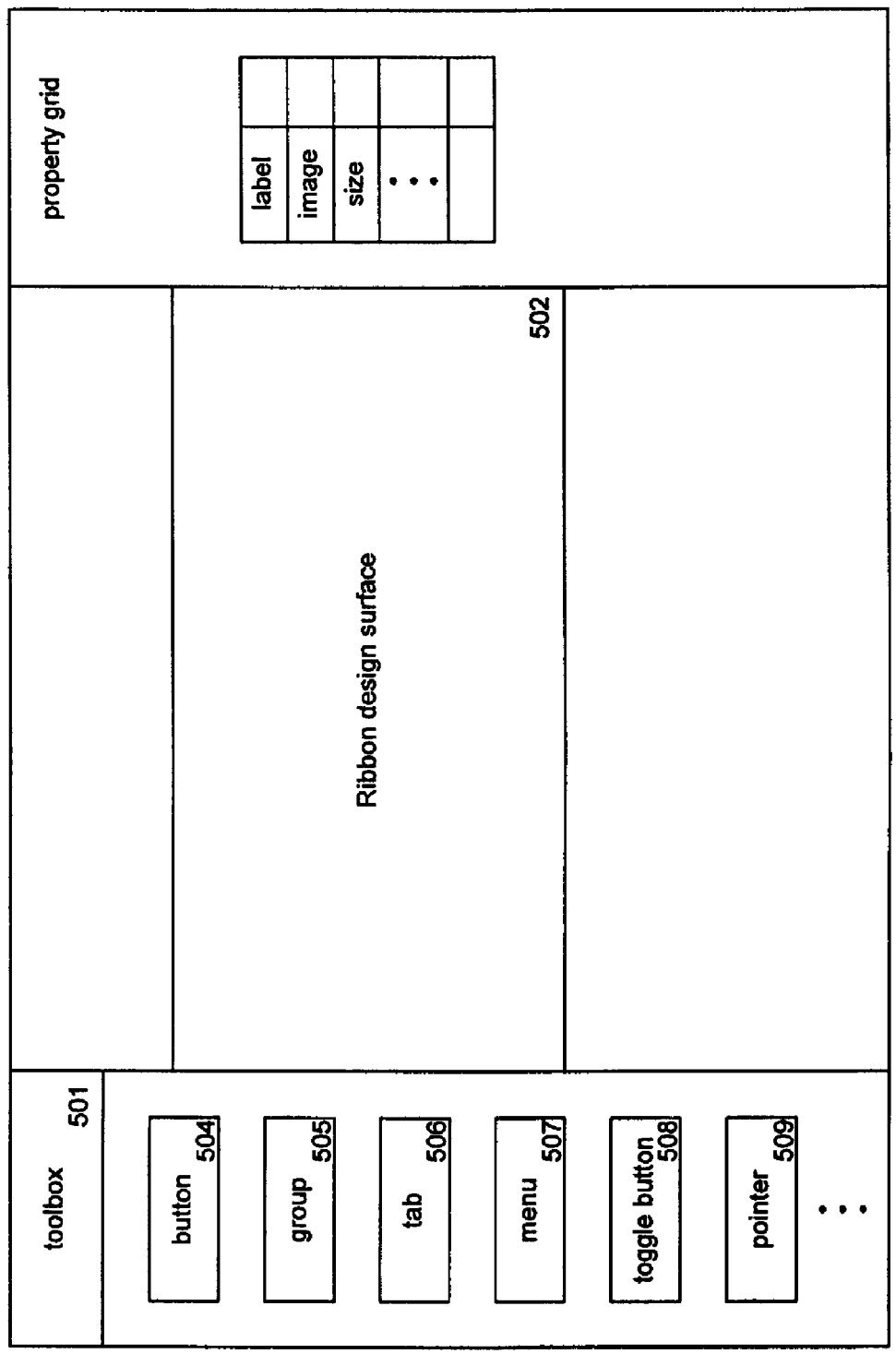
FIG. 5 is a block diagram that illustrates the visual designer tool user interface in one embodiment.
Figure 6:
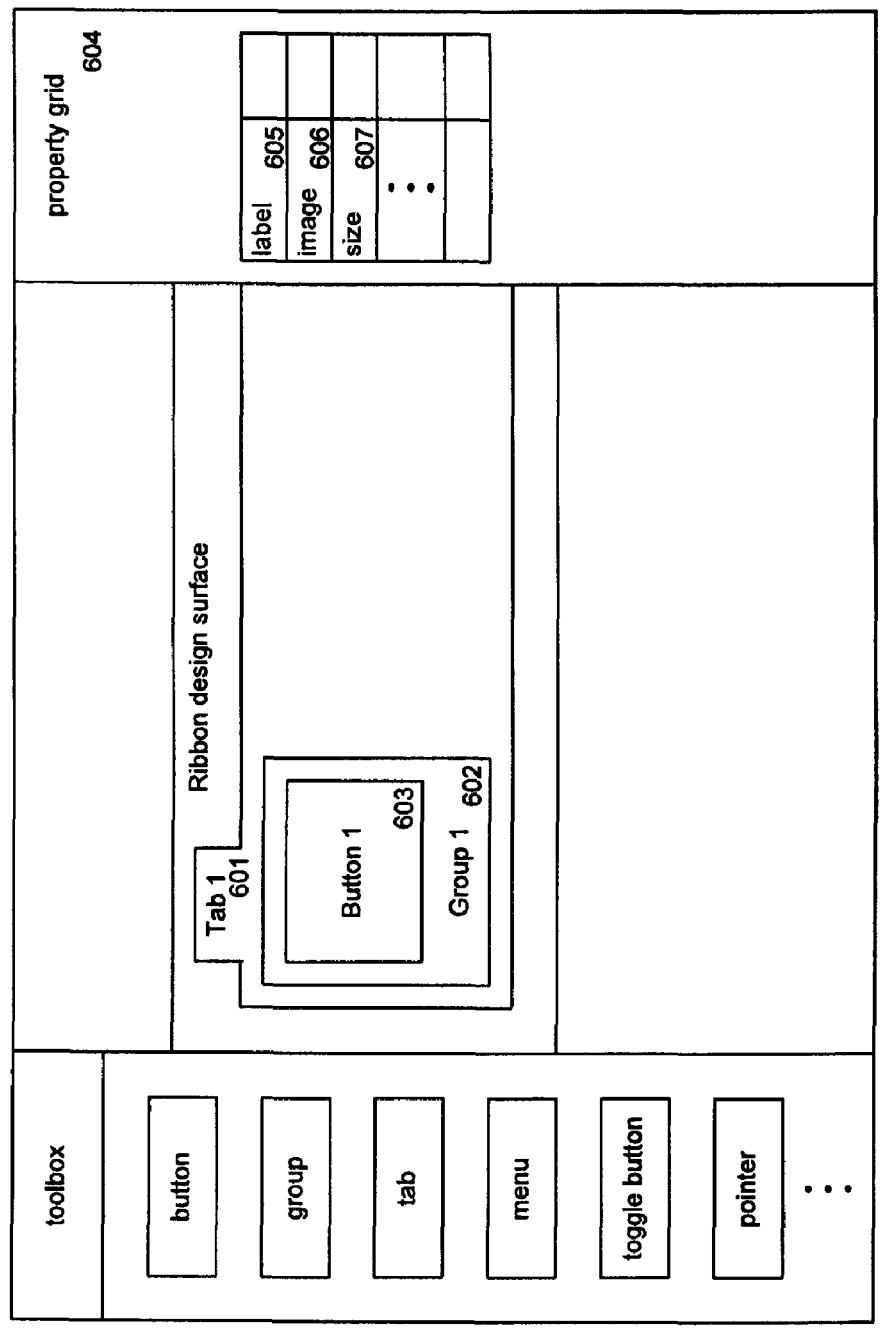
FIG. 6 is a block diagram that illustrates the visual designer tool user interface in one embodiment in which the developer has added a tab control, a group control, and a button control to the design surface.

The visual designer tool enables developers to add controls, or view objects, representing the Ribbon components from a toolbox or another design surface to a design surface to define the Ribbon layout. Controls may be added by dragging and dropping, copying and pasting, click-draw, double-clicking, and other ways. FIG. 5 is a block diagram that illustrates the visual designer tool user interface in one embodiment. A toolbox 501 contains controls representing Ribbon components, which may include a button 504, a group 505, a tab 506, a menu 507, a toggle button 508, a pointer 509, and other controls, including box, button group, check box, combo box, drop down, edit box, gallery, label, separator, split button, notify icon, tool tip, and other controls. The developer may add one or more controls to the Ribbon design surface 502 in order to create a custom Ribbon. For example, FIG. 6 is a block diagram that illustrates the visual designer tool user interface in one embodiment in which the developer has added a tab control 601, a group control 602, and a button control 603 to the design surface. A tab control adds a top-level tab to the Ribbon layout. Each tab provides a collection of features designed to help the user perform specific tasks within an application or document. Tabs may contain groups of controls. A group is used to define a collection of components of different types. For example, a tab that contains controls designed to help a user write a document may contain a font group, a paragraph group, a text group, and other groups. Each group may contain buttons, menus, and other controls. For example, a font group may contain a bold button, underline button, italicize button, and other controls.

Figure 7:
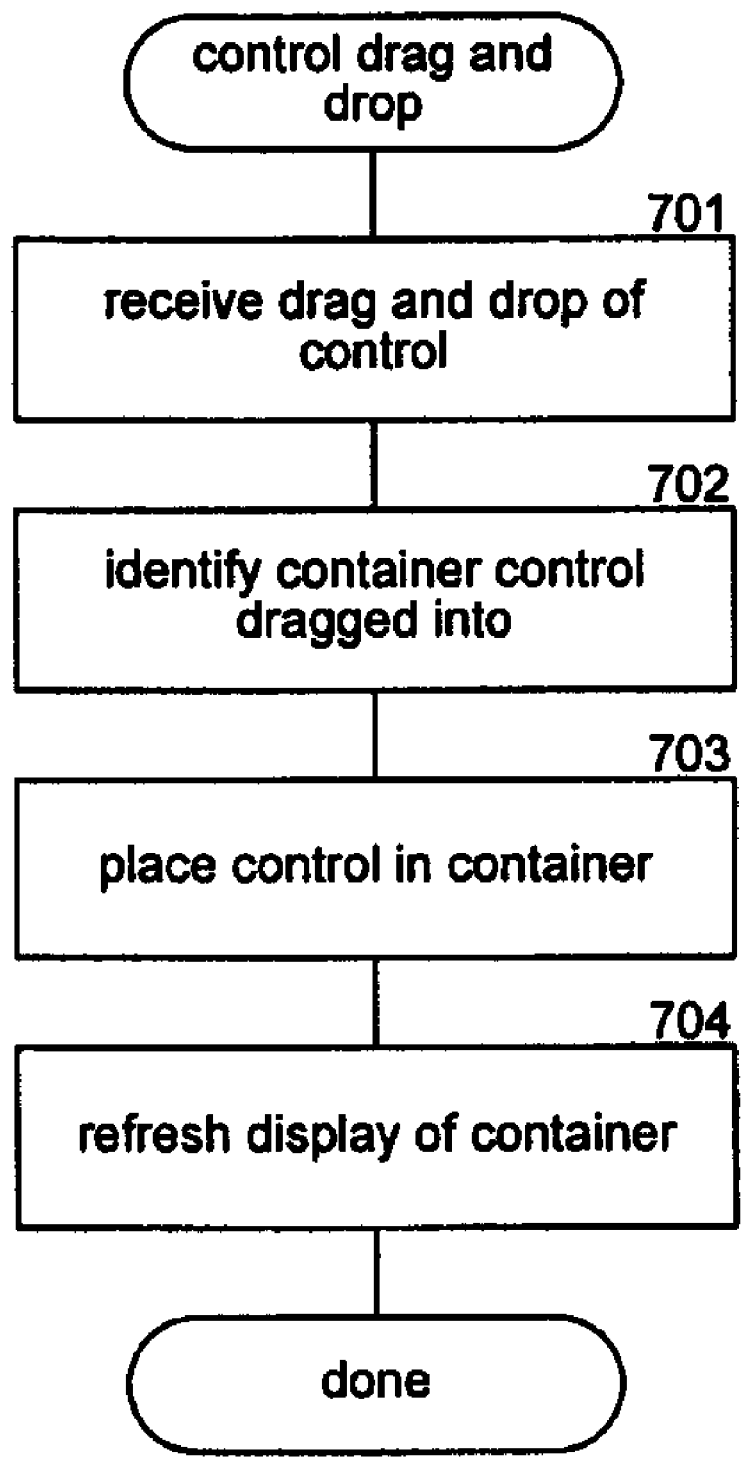
FIG. 7 is a flow diagram that illustrates the process of a control being added to a design surface by the developer in one embodiment.

FIG. 7 is a flow diagram that illustrates the process of a control being added to a design surface by the developer in one embodiment. In block 701, the visual designer tool receives a drag and drop of a control, initiated by the developer. In block 702, the visual designer tool identifies the container, or design surface, into which the control has been dragged and dropped by the developer. In block 703, the visual designer tool places the control in the identified container. In block 704, the visual designer tool refreshes display of the container.

Figure 8:
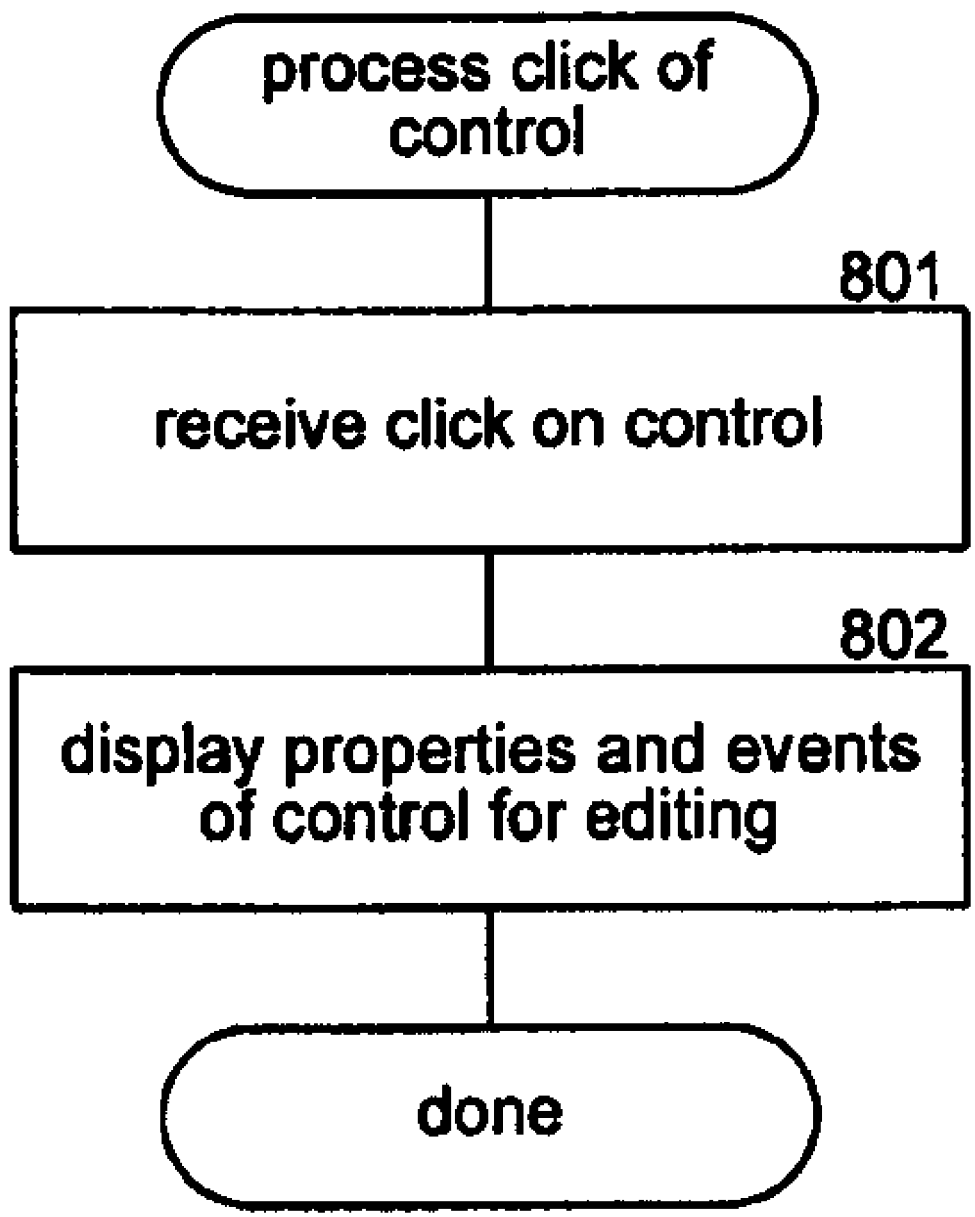
FIG. 8 is a flow diagram that illustrates the processing of a developer click on a control that has been added to a design surface in one embodiment.

Returning to FIG. 6, after the developer has added a control to the design surface, the developer may click on a control, or otherwise indicate a desire to display the properties of a control, in order to edit the properties of the control. The properties are displayed to the developer in a property grid 604. The properties may include label 605, image 606, size 607, and other properties. The developer may edit one or more of the properties by changing the values displayed in the property grid. For example, the developer may set "Tab1" as the label of a tab added to the design surface. In FIG. 6, the developer has set "Tab1" as the label of the tab 601, "Group1" as the label of the group 602, and "Button1" as the label of the button 603. Default labels and other properties may also be provided by the visual designer tool. For example, the first tab added to the design surface may have the default label of "Tab1," which may then be modified by the developer. FIG. 8 is a flow diagram that illustrates the processing of a developer click on a control that has been added to a design surface in one embodiment. In block 801, the visual designer tool receives a developer click on a control. In block 802, the visual designer tool displays the control's properties and events for editing by the developer.

Using the visual designer tool to extend the Ribbon user interface, the developer need only add controls to the design surface, arrange the controls as desired, and set the properties of the controls. The visual designer tool generates the code for the developers Ribbon extension according to the .NET Ribbon model, as in Table 3 above.

Designer—Complex Control Architecture

Some of the controls displayed in the toolbox and available for use by the developer may be complex controls. These controls represent complex Ribbon components. A complex Ribbon component is a component that may contain other Ribbon components as items. An example of a complex component is a menu, which may contain other components, such as buttons and sub-menus. The visual designer tool provides the developer with a complex control architecture that provides a nested design surface for the complex control into which the developer may drag and drop controls just as in the primary design surface. For example, the developer may add a menu to the design surface. The visual designer tool will provide the designer with a design surface that is exclusive to the menu; this design surface is provided within the primary design surface. The developer may then add buttons, submenus, and other controls into the menu's design surface.

Each complex control implements a ToolStripDropDown class which contains a ToolStripControlHost class. The ToolStripDropDown class represents a control that allows a user to select a single item from a list that is displayed. The ToolStripDropDown class replaces and adds functionality to the Menu class of previous versions of the .NET Framework. The ToolStripControlHost class, which hosts customized controls, comprises a container component that contains the complex control's items. At design time, a drop down icon may be added to the complex control that allows the developer to open and hide the container, or nested design surface. Once a complex control has been added to the design surface and the container has been opened, the visual designer tool provides the developer with a nested design surface that is specific to the complex control. The developer may add controls to this nested design surface just as in the primary design surface.

Figure 9:
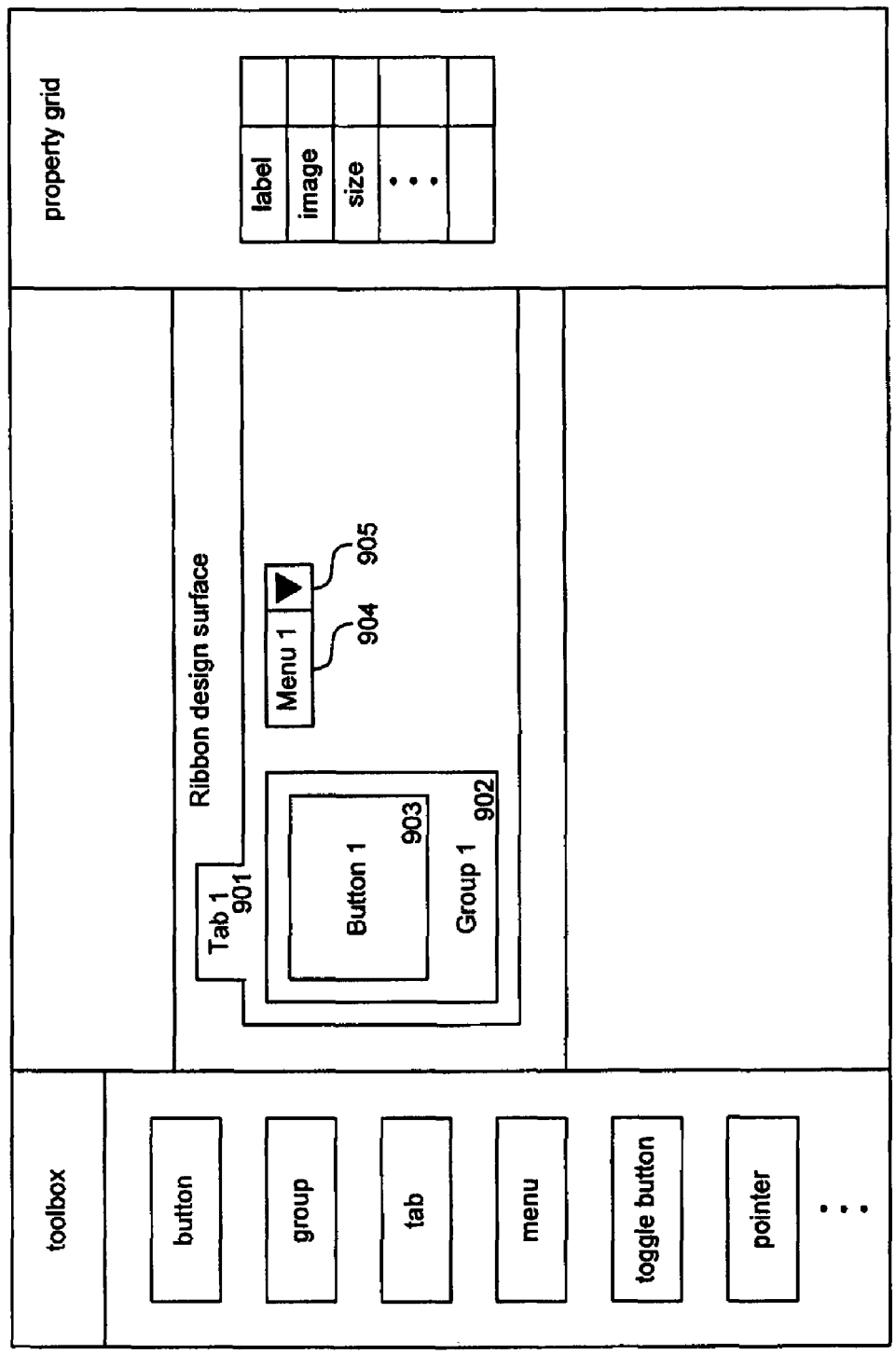
FIG. 9 is a block diagram that illustrates the visual designer tool user interface in one embodiment in which the developer has added a tab control, a group control, a button control, and a menu control to the design surface.
Figure 10:
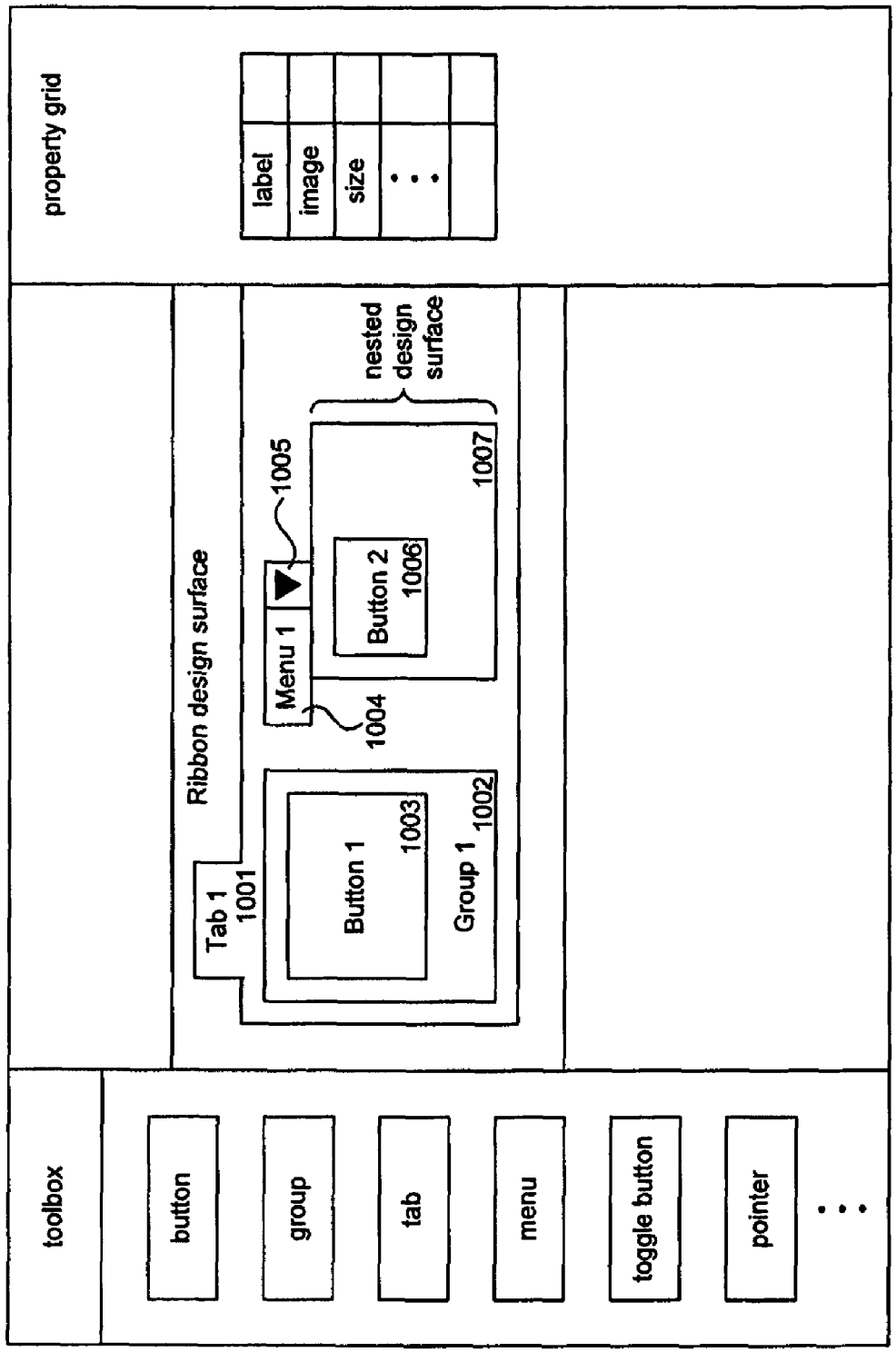
FIG. 10 is a block diagram that illustrates the visual designer tool user interface in one embodiment in which the developer has added a tab control, a group control, a button control, and a menu control to the design surface and has added a second button control to the nested design surface that corresponds to the menu control.

FIG. 9 is a block diagram that illustrates the visual designer tool user interface in one embodiment in which the developer has added a tab control 901, a group control 902, a button control 903, and a menu control 904 to the design surface. By clicking on the drop down icon 905, or otherwise indicating a desire to edit the complex control, a developer may cause the display of a nested design surface that is specific to the complex control. The developer may add controls to and edit controls in a nested design surface just as in the primary Ribbon design surface. FIG. 10 is a block diagram that illustrates the visual designer tool user interface in one embodiment in which the developer has added a tab control 1001, a group control 1002, a button control 1003, and a menu control 1004 to the design surface and has clicked on the drop down icon 1005 that corresponds to the menu control. The developer has added a second button control 1006 to the menu control's container 1007.

The computing devices on which the .NET Ribbon model and the visual designer tool may be implemented may include a central processing unit, memory, input devices (e.g., keyboard and pointing devices), output devices (e.g., display devices), and storage devices (e.g., disk drives). The memory and storage devices are computer-readable media that may contain instructions that implement the .NET Ribbon model and the visual designer tool. In addition, the data structures and message structures may be stored or transmitted via a data transmission medium, such as a signal on a communications link. Various communications links may be used, such as the Internet, a local area network, a wide area network, or a point-to-point dial-up connection.

The .NET Ribbon model and the visual designer tool may be implemented on various computing systems or devices including personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The .NET Ribbon model and the visual designer tool may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computer system to create custom code for extending a user interface, the method comprising:
    creating view objects for components that are available for inclusion in an extension to the user interface;
    displaying a visual representation of the created view objects;
    receiving a selection of a view object and an indication of adding the view object to a design surface;
    generating a visual representation of the view object in the design surface;
    displaying properties and events for the view object within the design surface, wherein the properties indicating visual characteristics of the view object, and the events indicating events relating to the view object that the custom code is to respond;
    receiving values for the properties and the events; and
    generating by the computer system the custom code for implementing the extension to the user interface represented by the design surface with the properties and the events, wherein generating the custom code is based on an alternate model for a primary model for extending the user interface, and the primary model uses a non-programmatic description of a relation between the view objects and uses a callback mechanism for providing notifications of the events.

2. The method of claim 1 wherein the user interface is a Ribbon user interface of a Microsoft Office application.

3. The method of claim 1 wherein the view object is a custom WinForms control.

4. The method of claim 1 wherein displaying the properties and the events for the view object comprises using a custom TypeDescriptionProvider class to expose only properties and events of a user interface component that the view object represents, hiding any properties and events not associated with the user interface component that the view object represents.

5. A computer-readable storage device for controlling a computing device to create custom code for extending a user interface of a host application, the computer-readable storage device includes computer-executable instructions to perform a method comprising:

displaying representations of visual components that are available for inclusion in an extension to the user interface of the host application;

displaying a design surface to provide a representation of the extension to the user interface of the host application;

in response to a user selecting a representation of a visual component and indicating to add the representation of the visual component to the design surface, displaying the representation of the visual component within the design surface;

displaying properties and events for the visual component within the design surface, wherein the properties indicating visual characteristics of the visual component, and the events indicating events relating to the visual component that the custom code is to respond;

receiving from the user values for the properties and events; and generating the custom code for implementing the extension to the user interface of the host application represented by the design surface with the properties and the events, wherein the generating the custom code is based on an alternate model for a primary model for extending the user interface of the host application, and the primary model uses a non-programmatic description of a relation between the visual components and uses a callback mechanism for providing notifications of the events.

6. The computer-readable storage device of claim 5 wherein the user interface is a Ribbon user interface of a Microsoft Office application.

7. The computer-readable storage device of claim 5 wherein the custom code for the visual component is implemented using a custom WinForms control.

8. The computer-readable storage device of claim 5 wherein the design surface includes a nested design surface.

9. The computer-readable storage device of claim 8 wherein the visual component is added to the nested design surface.

10. The computer-readable storage device of claim 5 wherein the properties have default values.

11. The computer-readable storage device of claim 5 wherein the properties include a label for the visual component.

12. A computing device for creating custom code for extending a user interface of a host application, the computing device comprising:

a memory storing computer-executable instructions of a component that displays visual components that are available for inclusion in an extension to the user interface of the host application;

a component that displays a design surface to provide a representation of the extension to the user interface of the host application;

a component that receives from a user selecting a visual component and an indication to add the visual component to the design surface;

a component that adds the visual component to the design surface;

a component that receives from the user values for properties and events of the visual component that has been added to the design surface, wherein the properties indicating visual characteristics of the visual component, and the events indicating events relating to the visual component that the custom code is to respond;

a component that generates the custom code for implementing the extension to the user interface of the host application represented by the design surface with the properties and the events, wherein the generating the custom code is based on an alternate model for a primary model for extending the user interface of the host application, and the primary model uses a non-programmatic description of a relation between the visual components and uses a callback mechanism for providing notifications of the events; and a processor that executes the computer-executable instructions stored in the memory.

13. The computing device of claim 12 wherein the user interface is a Ribbon user interface of a Microsoft Office application.

14. The computing device of claim 12 wherein the custom code for the visual component is implemented using a custom WinForms control.

15. The computing device of claim 12 wherein the design surface includes a nested design surface.

* * * * *